(12) United States Patent
Dodak (10) Patent No.: US 11,613,238 B2
(45) Date of Patent: Mar. 28, 2023

(54) APPARATUS AND METHOD FOR CALCULATING ABSOLUTE ANGULAR POSITION FOR CONTROLLING VEHICLE STEERING SYSTEM

(71) Applicant: HL MANDO CORPORATION, Gyeonggi-do (KR)

(72) Inventor: Tony Alan Dodak, White Lake, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 604 days.

(21) Appl. No.: 16/672,528

(22) Filed: Nov. 4, 2019

(65) Prior Publication Data
US 2020/0156702 A1 May 21, 2020

Related U.S. Application Data

(60) Provisional application No. 62/768,035, filed on Nov. 15, 2018.

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 8/282* (2013.01); *B60T 13/741* (2013.01);
(Continued)

(58) Field of Classification Search
CPC ........ B60T 13/746; B60T 1/065; B60T 8/282; B60T 13/741; B62D 5/0442; B62D 5/046;
(Continued)

(56) References Cited

U.S. PATENT DOCUMENTS 6,208,923 B1 3/2001 Hommel
8,924,075 B2 * 12/2014 Jang ......................... B62D 6/08
701/41

(Continued)

FOREIGN PATENT DOCUMENTS

CN   106005003   10/2016
DE   600 11 684   6/2005
(Continued)

OTHER PUBLICATIONS

International Search Report for PCT/KR2019/015581 dated Mar. 18, 2020 and its English translation from WIPO.
(Continued)

*Primary Examiner* — Marthe Y Marc-Coleman
(74) *Attorney, Agent, or Firm* — Ladas & Parry, LLP (57) ABSTRACT

A vehicle steering system comprises: a motor assembly operably coupled to a steering rack, the motor assembly comprising a motor having a rotor and a motor position sensor configured to sense a rotor angle of the motor in a single-turn range; and a rotary-to-linear conversion mechanism operably coupled between the motor assembly and the steering rack, the rotary-to-linear conversion mechanism comprising a rotor operably coupled to the rotor of the motor. A processor calculates an absolute angular position of the pinion in a full-turn range of rotation of the pinion based on the sensed rotor angle of the motor and a pinion angle sensed by a pinion angle sensor in a single-turn range, or based on the sensed rotor angle of the motor and an angle of the rotor of the rotary-to-linear conversion mechanism sensed by an angular position sensor in the single-turn range.

12 Claims, 6 Drawing Sheets

(51) Int. Cl.

| | | |
|---|---|---|
| *B60T 8/28* | (2006.01) | |
| *B62D 5/04* | (2006.01) | |
| *B62D 15/02* | (2006.01) | |
| *F16D 65/097* | (2006.01) | |
| *F16D 65/16* | (2006.01) | |
| *G01B 7/315* | (2006.01) | |
| *H02K 1/14* | (2006.01) | |
| *H02K 1/276* | (2022.01) | |
| *H02K 21/16* | (2006.01) | |
| *H02K 29/03* | (2006.01) | |
| *F16D 55/14* | (2006.01) | |
| *F16D 121/24* | (2012.01) | |
| *F16D 125/50* | (2012.01) | |
| *F16D 127/06* | (2012.01) | |

(52) U.S. Cl.
CPC ........... *B62D 5/046* (2013.01); *B62D 5/0442* (2013.01); *B62D 15/021* (2013.01); *F16D 65/0979* (2013.01); *F16D 65/16* (2013.01); *G01B 7/315* (2013.01); *H02K 1/146* (2013.01); *H02K 1/2766* (2013.01); *H02K 21/16* (2013.01); *H02K 29/03* (2013.01); *F16D 55/14* (2013.01); *F16D 2121/24* (2013.01); *F16D 2125/50* (2013.01); *F16D 2127/06* (2013.01)

(58) Field of Classification Search
CPC ... B62D 15/021; F16D 65/0979; F16D 65/16; F16D 55/14; F16D 2121/24; G01B 7/315; H02K 1/146; H02K 1/2766; H02K 21/16; H02K 29/03
See application file for complete search history.

(56) References Cited

U.S. PATENT DOCUMENTS

| | | | |
|---|---|---|---|
| 8,925,938 B2 * | 1/2015 | Yamanaka | B62D 1/16 280/93.514 |
| 8,960,037 B2 * | 2/2015 | Yamanaka | B62D 5/0448 74/424.81 |
| 9,114,833 B2 * | 8/2015 | Becker | G01B 7/30 |
| 2014/0311817 A1 | 10/2014 | Kita et al. | |
| 2016/0221605 A1 | 8/2016 | Pregniard et al. | |
| 2017/0120947 A1 | 5/2017 | Kim | |

FOREIGN PATENT DOCUMENTS

| | | | |
|---|---|---|---|
| DE | 10 2017 217 581 | | 4/2019 |
| JP | 2004-351988 | | 12/2004 |
| JP | 2004351988 A | * | 12/2004 |
| JP | 2006-290061 | | 10/2006 |
| JP | 2017-19443 | | 1/2017 |
| KR | 10-1398091 | | 5/2014 |
| KR | 10-2019-0001964 | | 1/2019 |

OTHER PUBLICATIONS

Written Opinion of the International Searching Authority for PCT/KR2019/015581 dated Mar. 18, 2020 and its English translation from WIPO.
Office Action dated Dec. 5, 2022 for Chinese Patent Application No. 201980075447,6 and its English translation by Google Translate.
Office Action dated Nov. 21, 2022 for German Patent Application No. 11 2019 005 763,4 and its English translation by Google Translate.

* cited by examiner

APPARATUS AND METHOD FOR CALCULATING ABSOLUTE ANGULAR POSITION FOR CONTROLLING VEHICLE STEERING SYSTEM

CROSS REFERENCE TO PARENT APPLICATION(S)

This application claims the benefit of U.S. Patent Application Ser. No. 62/768,035, filed on Nov. 15, 2018, entitled "RACK POSITION SENSOR; VARIABLE LAMINATIONS STACKED AXIALLY TO REDUCE THE TORQUE RIPPLE AND COGGING TORQUE OF ELECTRIC MOTORS; SPINDLE NUT SOFT STOP FOR MOC BRAKE PAD SERVICE RELEASE FUNCTION; INTERNAL GEAR UNIT BRAKE; STEPPED PISTON WITH STEEL FOOTING ASSEMBLY FOR HD TRUCK MOC; PLANETARY HARMONIC GEAR", which is all hereby incorporated herein by reference in its entirety.

BACKGROUND

Various embodiments of the present disclosure generally relate to sensing or calculating absolute angular positions related to steering operation and control of a vehicle.

In many applications, including motor vehicles, it can be important to know the absolute angular position of a rotating body. As but one example, when starting a motor vehicle, it may sometimes be necessary to know which steering revolution the steering wheel is in instantly at power up. Not only does this allow the driver to know which way the front wheels are directed before placing the vehicle into gear, but some computerized vehicle control systems might require to know the steering position as well. For example, in an automated steering system, such as a steer-by-wire system, the control system must know the position of the steering wheel at all times in order to control the direction of the vehicle. Not only must these systems know the position of the steering wheel, they must know in which revolution the steering wheel is in at the time of measurement.

One such device includes a relatively large input gear installed on the steering shaft. The input gear is meshed with two relatively small output gears. A first magnetic field sensor and a second magnetic field sensor are placed near the first and second output gears, respectively. The output gears are constructed so that as they rotate the angular position of the output gears is sensed by the sensors. The ratio of the first output gear to the second output gear is chosen so that the output gears are out of phase as they rotate through multiple revolutions. The signals from the sensors are used to determine the absolute position of the steering shaft. The second sensor provides a relatively accurate, high resolution signal representing the angular position of the second output gear. This signal, used in conjunction with the out-of-phase angular position signal from the first sensor is used to determine which revolution the steering shaft is in when the signal is received from the second sensor. Thus, the absolute position of the steering shaft is known.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to certain embodiments of the present disclosure, a vehicle steering system, may comprise: a motor assembly comprising a motor having a first rotor and a motor position sensor configured to sense a first rotor angle of the motor in a single-turn range; a rotary-to-linear conversion mechanism operably coupled between the motor assembly and a steering rack to convert a rotational force of the motor into a linear force for moving the steering rack, the rotary-to-linear conversion mechanism comprising a second rotor operably coupled to the first rotor of the motor and an angular position sensor configured to sense a second rotor angle of the second rotor of the rotary-to-linear conversion mechanism in a single-turn range, wherein the steering rack is operably coupled to a pinion; and a processor configured to calculate an absolute angular position associated with a position of steering rack in a full-turn range of movement of the steeling rack based on the sensed first rotor angle of the motor and the sensed second rotor angle of the second rotor of the rotary-to-linear conversion mechanism. The absolute angular position associated with the position of the steering rack in the full-turn range associated with the movement of the steering rack may be or correspond to an absolute angular position of the pinion in the full-turn range of rotation of the pinion. The single-turn range may be a three hundred sixty (360) degree range, and the full-turn range may correspond to a movable range of the steering rack, such as a rotatable range of a pinion or steering wheel. The rotary-to-linear conversion mechanism may comprise a ball-nut assembly.

The processor may be configured to calculate the absolute angular position associated with the position of the steering rack based on the sensed first rotor angle of the motor and the sensed second rotor angle of the second rotor of the rotary-to-linear conversion mechanism using ratio between rates at which the first rotor of the motor and the second rotor of the rotary-to-linear conversion mechanism rotate.

The processor may be configured to calculate the absolute angular position associated with the position of the steering rack based on the sensed first rotor angle of the motor and the sensed second angle of the second rotor of the rotary-to-linear conversion mechanism using a Vernier algorithm.

The rotary-to-linear conversion mechanism comprises a first gear configured to be rotated by the first rotor of the motor and the second rotor of the rotary-to-linear conversion mechanism may be a second gear rotatably connected to the first gear, the angular position sensor is configured to sense the angle of the second gear of the rotary-to-linear conversion mechanism in a single-turn range, and the processor may be configured to calculate the absolute angular position associated with the position of the steering rack in the full-turn range of movement of the steering rack based on the sensed rotor angle of the motor and the sensed angle of the second gear of the rotary-to-linear conversion mechanism.

According to some embodiments of the present disclosure, a vehicle steering system may comprise: a pinion angle sensor configured to sense a pinion angle in a single-turn range, wherein the pinion angle is associated with a pinion operably coupled to a steering rack; a motor assembly operably coupled to the steering rack, the motor assembly comprising a motor having a rotor and a motor position sensor configured to sense a rotor angle of the motor in a single-turn range; and a processor configured to calculate an absolute angular position associated with the position of the steering rack in a full-turn range of movement of the steering rack based on the sensed pinion angle and the sensed rotor angle of the motor. The absolute angular position associated with the position of the steering rack in the full-turn range associated with the movement of the steering rack may be or correspond to an absolute angular position of the pinion in the full-turn range of rotation of the pinion. The single-turn range may be a three hundred sixty (360) degree range, and the full-turn range may correspond to a movable range of the steering rack, such as a rotatable range of a pinion or steering wheel.

The processor may be configured to calculate the absolute angular position associated with the position of the steering rack based on the sensed pinion angle and the sensed rotor angle of the motor using ratio between rates at which the pinion and the rotor of the motor rotate.

The processor may be configured to calculate the absolute angular position associated with the position of the steering rack based on the sensed pinion angle and the sensed rotor angle of the motor using a Vernier algorithm.

The vehicle steering system may further comprising a rotary-to-linear conversion mechanism operably coupled between the motor assembly and the steering rack. The rotary-to-linear conversion mechanism may comprise a ball-nut assembly.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
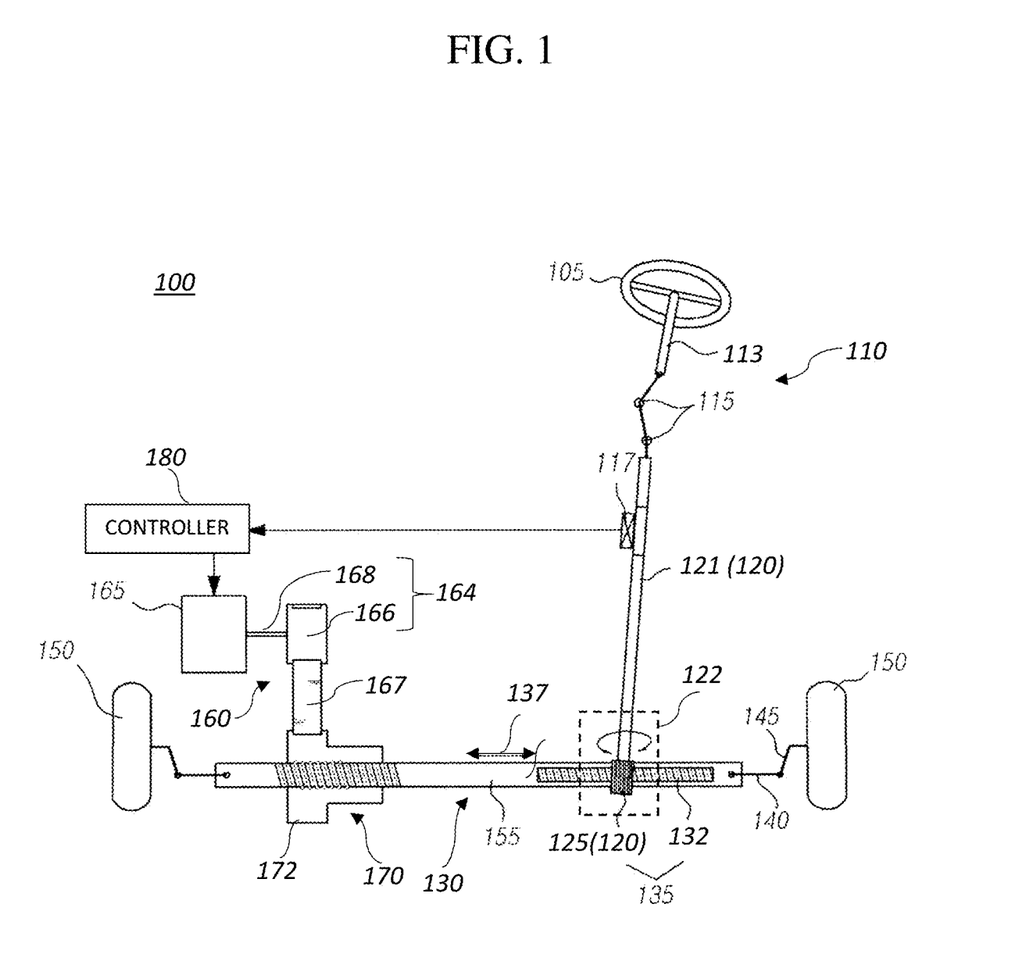
FIG. 1 is a conceptual view of a vehicle steering system according to an exemplary embodiment of the present disclosure.

Referring now to FIG. 1, a steering system 100 for use in a vehicle is illustrated. The steering system 100 allows a driver or operator of the vehicle to control the direction of the vehicle through the manipulation of the steering system 100. The steering system 100 may comprise a steering column 110, a pinion 120 including a pinion shaft 121 and a pinion gear 125, a rock assembly 130, a motor assembly 160 and a controller 180.

The steering column 110 provides mechanical manipulation of the vehicle's wheels in order to control the direction of the vehicle. The steering column 110 includes a steering wheel 105. The steering wheel 105 is positioned so that the driver can apply a rotational force to the steering column 110. An upper steering column shaft 113 is secured to the steering wheel 105 at one end and a column universal joint 115 at the other. The column universal joint 115 couples the upper steering column shaft 113 to the pinion shaft (or a lower steering column shaft) 121. The pinion shaft 121 may be secured to the column universal joint 115 at one end and the gear housing 122 at the other. The gear housing 122 accommodates the pinion gear 125. The pinion gear 125 of the gear housing 122 is positioned to make contact with a rack gear (such as a matching toothed portion) 132 of the rack assembly 130. The pinion gear 125 has, for example, but not limited to, helical teeth that are meshingly engaged with straight-cut teeth of the rack gear 132. The pinion gear 125, in combination with the rack gear 132, form a rack and pinion gear set 135. A rack 155 is coupled to the vehicle's steerable road wheels 150 with steering linkage. Tie rods 140 are secured to the rack assembly 130 at one end and knuckles 145 at the other.

As a rotational force is applied to the steering column 110, through the manipulation of steering wheel 105 or other applied force, the pinion gear 125 of the gear housing 122 is accordingly rotated. The movement of the pinion gear 125 causes the movement of the rack assembly 130 in the direction of arrows 137, which in turn manipulates the tie rods 140 and the knuckles 45 in order to reposition the road wheels 150. Accordingly, when the steering wheel 105 is turned, the rack and pinion gear set 135 converts the rotary motion of the steering wheel 105 into the linear motion of the rack 155.

In order to assist the driver's or operator's applied force to the steering system 100, an electric motor 165 is energized to provide power assist to the movement of the rack 155, aiding in the steering of the vehicle by the vehicle operator. The electric motor 165 may comprise a rotor 164 including a motor shaft 168 and a motor pulley 166. The electric motor 165 provides a torque force to the motor pulley 166 via the motor shaft 168. The rotation force of the motor pulley 166 is transferred to a belt 167. Alternatively, the motor pulley 166 can be directly coupled to the rack 155, or the belt 167 is replaced by a chain or gear system or any rotary that provides a rotational force to a rotary-to-linear conversion mechanism 170 (e.g. a ball-screw assembly). As a torque force is applied to the belt 167, the rotational force is converted into a linear force via the rotary-to-linear conversion mechanism 170, and the rack 155 is moved in one of the directions of arrows 137. Of course, the direction of movement of rack assembly 130 corresponds to the rotational direction of the motor pulley 166. The configuration belt 167 and the position of the electric motor 165 allow an inner engagement surface of the belt 167 to wrap around and engage both the motor pulley 166 and a ball-screw pulley 172, that is fixed to a rotary portion (or a rotor) of the ball-screw assembly 170.

The electric motor 165 is actuated by a controller 180 that receives inputs from a torque and/or rotational position sensor(s) 117. The rotational position sensor 117 provides a steer angle signal to the controller 180.

FIG. 1 illustrate a power assist steering system that includes a mechanical connection between the hand wheel 105 and the rack assembly 130. Alternatively, and in applications in which a "steer-by-wire system" is employed, there is no direct mechanical connection between the hand wheel 105 and the rack assembly 130. In this application, the driver's rotational movement of the hand wheel 105 (and/or signal from an equivalent driver control device such as a joystick, pedal(s) and other mechanism for manipulation by the driver) is input into the controller 180 while the electric motor 165 provides the necessary force to manipulate the rack assembly 130.

Figure 2:
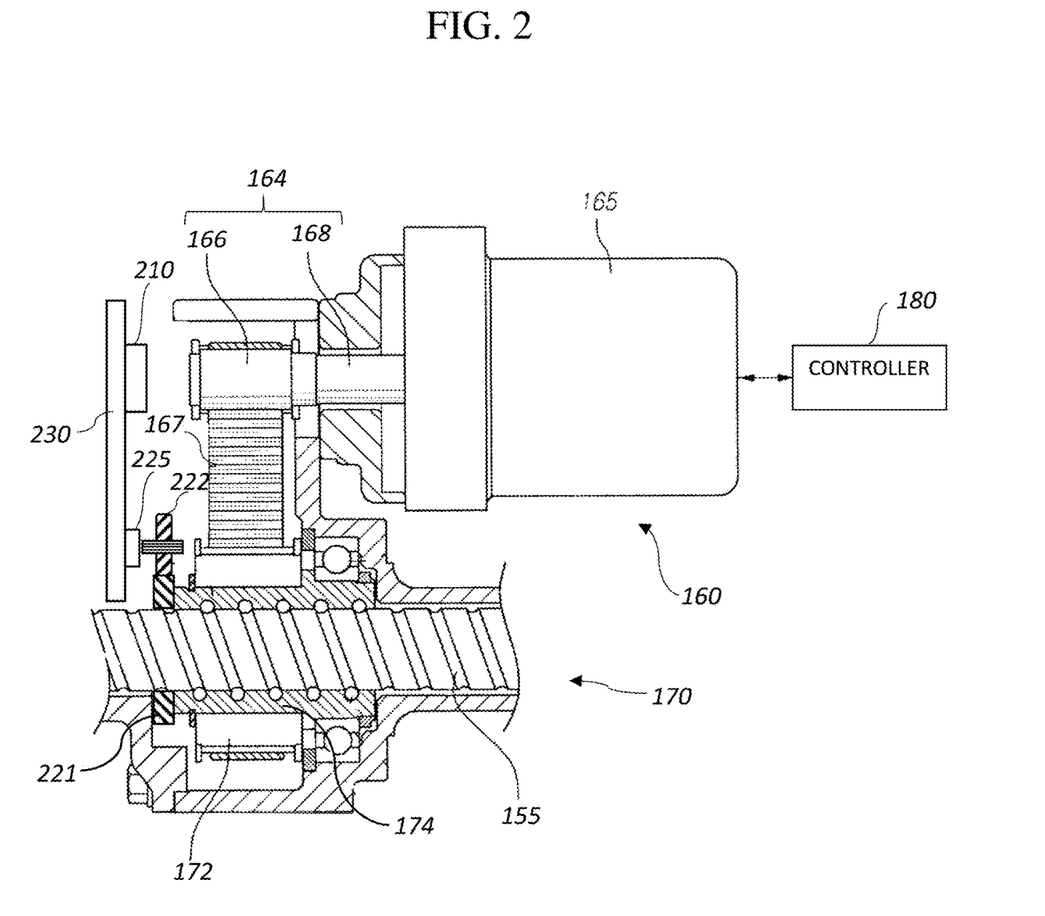
FIG. 2 shows a partial cross-sectional view of a motor assembly and a rotary-to-linear conversion mechanism according to an exemplary embodiment of the present disclosure.

FIG. 2 shows a partial cross-sectional view of a motor assembly and a rotary-to-linear conversion mechanism according to an exemplary embodiment of the present disclosure.

A motor position sensor 210 is supported on a circuit board 230, and is electrically connected with the circuit board 230. For example, the motor position sensor 210 is directly mounted on a side of the circuit board 230 facing the distal end of the rotor 164 of the motor 165.

The motor position sensor 210 may be disposed in sensing relationship with the rotor 164 of the motor 165. For example, the motor position sensor 210 may be positioned adjacent to the distal end of the motor pulley 166 or the motor rotation shaft 168.

The motor position sensor 210 is responsive to the rotation of the motor pulley 166 or the motor rotation shaft 168. For example, the motor position sensor 210 and the motor rotation shaft 168 (or the motor pulley 166) are configured such that the motor position sensor 210 can detect or sense an angular position of the motor rotor 164 (such as the motor pulley 166 or the motor rotation shaft 168) in a single-turn range which is a range of zero to three hundred sixty degrees (0-360°). The motor position sensor 210 may generate an output signal indicative of the sensed angular position of the motor rotor 164.

The motor position sensor 210 can be any suitable device(s) for generating signal responsive to the rotation of the motor rotor 164. For example, the motor position sensor 210 can be a non-contact limit switch. The motor position sensor 210 may be a Hall effect sensor, a magnetoresisitve (MR) sensor, or any other sensor known in the art with similar capabilities. Correspondingly, the motor rotor 164, such as the motor pulley 166 or the motor rotation shaft 168, may include a magnetic gradient formed on a surface of the motor rotor 164 defined by a plurality of alternating north and south magnetically charged elements circumferentially spaced about the circumference of the motor pulley 166 or the motor rotation shaft 168. The magnetically charged elements of the motor rotor 164 can be any suitable component or material capable of retaining a magnetic charge. The magnetically charged elements of the motor rotor 164 can be formed and/or mounted on the surface of the motor pulley 166 or the motor rotation shaft 168 or can be disposed internally in the motor pulley 166 or the motor rotation shaft 168. For example, the magnet for sensing the motor position may be pressed on the end of the motor pulley 166 or the motor rotation shaft 168.

The rotary-to-linear conversion mechanism 170 may comprises a rotor such as a main-gear 221, a sub-gear 222 and the pulley 172. The main-gear 221 of the rotary-to-linear conversion mechanism 170 is operably coupled to the ball-screw pulley 172 so that the main gear 221 can be rotated together with the ball-screw pulley 172. The main-gear 221 of the rotary-to-linear conversion mechanism 170 is directly or indirectly coupled to the ball-screw pulley 172. For example, the main-gear 221 of the rotary-to-linear conversion mechanism 170 is indirectly connected through a ball nut 174. The main-gear 221 rotatably engages with the sub-gear 222. According to some embodiments of the present disclosure, the rotary-to-linear conversion mechanism 170 may have only one single sub-gear.

As the sub-gear 222 of the rotary-to-linear conversion mechanism 170 rotates, an angular position sensor 225 of the rotary-to-linear conversion mechanism 170 may detect or sense an angular position of the sub-gear 222 in a single-turn which is a range of zero to three hundred sixty degrees (0-360°).

The angular position sensor 225 of the rotary-to-linear conversion mechanism 170 is supported on the circuit board 230, and is electrically connected with the circuit board 230. For example, the angular position sensor 225 is directly mounted on a side of the circuit board 230 facing the sub-gear 222 of the rotary-to-linear conversion mechanism 170. Alternatively, the angular position sensor 225 may be supported on another circuit board which is a separate circuit from the circuit board 230.

The angular position sensor 225 of the rotary-to-linear conversion mechanism 170 may be disposed in sensing relationship with the sub-gear 222 of the rotary-to-linear conversion mechanism 170. For example, the angular position sensor 225 may be positioned adjacent to the sub-gear 222.

The angular position sensor 225 of the rotary-to-linear conversion mechanism 170 is responsive to the rotation of the sub-gear 222 of the rotary-to-linear conversion mechanism 170. For example, the angular position sensor 225 and the sub-gear 222 are configured such that the angular position sensor 225 can detect or sense an angular position of the sub-gear 222 in a single-turn range which is a range of zero to three hundred sixty degrees (0-360°). The angular position sensor 225 may generate an output signal indicative of the sensed angular position of the sub-gear 222 of the rotary-to-linear conversion mechanism 170.

The angular position sensor 225 of the rotary-to-linear conversion mechanism 170 can be any suitable device(s) for generating signal responsive to the rotation of the sub-gear 222 of the rotary-to-linear conversion mechanism 170. For example, the angular position sensor 225 can be a non-contact limit switch. The angular position sensor 225 may be a Hall effect sensor, a MR sensor, or any other sensor known in the art with similar capabilities. Correspondingly, the sub-gear 222 of the rotary-to-linear conversion mechanism 170 may include a magnetic gradient formed on a surface of the sub-gear 222 defined by a plurality of alternating north and south magnetically charged elements circumferentially spaced about the circumference of the sub-gear 222. The magnetically charged elements of the sub-gear 222 can be any suitable component or material capable of retaining a magnetic charge. The magnetically charged elements of the sub-gear 222 can be formed and/or mounted on the surface of the sub-gear 222 or can be disposed internally in the sub-gear 222. For example, the magnet for sensing the position of the sub-gear 222 may be pressed on one surface of the sub-gear 222.

Alternatively, the angular position sensor 225 of the rotary-to-linear conversion mechanism 170 is configured to sense or detect an angular position of another rotor of the rotary-to-linear conversion mechanism, for example, but not limited to, the ball-screw pulley 172 or the main-gear 221, instead of the sub-gear 222.

Figure 3:
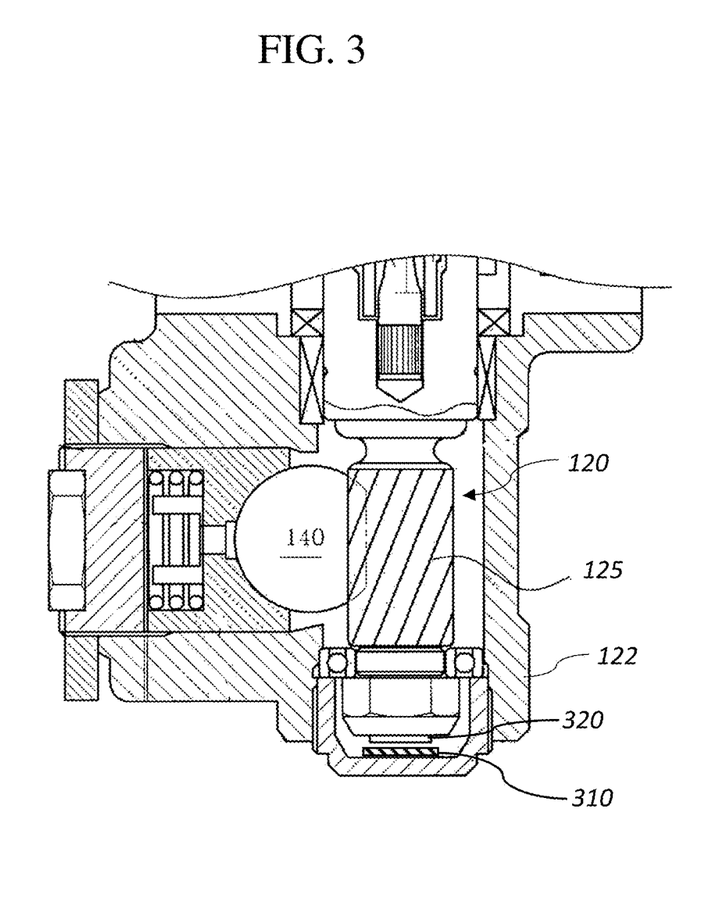
FIG. 3 shows a partial cross-sectional view of a pinion gear housing according to an exemplary embodiment of the present disclosure.

FIG. 3 shows a partial cross-sectional view of a pinion gear housing according to an exemplary embodiment of the present disclosure.

A pinion angle sensor 310 is supported on the gear housing 122, and is electrically connected with the controller 180 of FIG. 1. For example, the pinion angle sensor 210 is directly mounted on an inner surface of the gear housing 122 facing the distal end of the pinion 120 such as the pinion gear 125.

The pinion angle sensor 310 may be disposed in sensing relationship with the pinion 120. For example, the pinion angle sensor 310 may be positioned adjacent to the distal end of the pinion gear 125.

The pinion angle sensor 310 is responsive to the rotation of the pinion 120. For example, the pinion angle sensor 310 and the pinion gear 125 are configured such that the pinion angle sensor 310 can detect or sense an angular position of the pinion 120 (e.g. the pinion gear 125) in a single-turn range which is a range of zero to three hundred sixty degrees (0-360°). The pinion angle sensor 310 may generate an output signal indicative of the sensed angular position of the pinion 120.

The pinion angle sensor 310 can be any suitable device(s) for generating signal responsive to the rotation of the pinion 120. For example, the pinion angle sensor 310 can be a non-contact limit switch. The pinion angle sensor 310 may be a Hall effect sensor, a MR sensor, or any other sensor known in the art with similar capabilities. Correspondingly, the pinion 120 may include a magnetic gradient formed on the distal end 320 of the pinion 120 defined by a plurality of alternating north and south magnetically charged elements circumferentially spaced about the circumference of the pinion gear 125. The magnetically charged elements of the pinion 120 can be any suitable component or material capable of retaining a magnetic charge. The magnetically charged elements of the pinion 120 can be formed and/or mounted on the surface of the pinion 120 or can be disposed internally in the pinion 120. For example, the magnet for sensing the pinion position may be pressed on the end 320 of the pinion gear 125.

Figure 4:
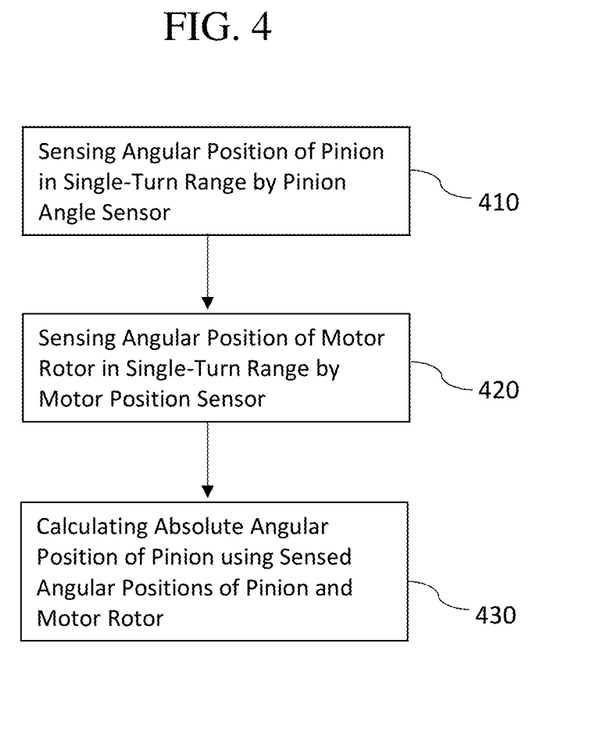
FIG. 4 is a flow diagram of a method for calculating an absolute angular position associated with a position of a steering rack according an exemplary embodiment of the present disclosure.

FIG. 4 is a flow diagram of a method for calculating an absolute angular position associated with a position of a steering rack according an exemplary embodiment of the present disclosure.

At step 410, the pinion angle sensor 310 detects or senses an angular position of the pinion 120 (e.g. the pinion gear 125) in a single-turn range which is a range of zero to three hundred sixty degrees (0-360°). The motor pinion angle sensor 310 generates and transmits an output signal indicative of the sensed angular position of the pinion 120 to the controller 180.

At step 420, the motor position sensor 210 detects or senses an angular position of the motor rotor 164 (such as the motor pulley 166 or the motor rotation shaft 168) in a single-turn range which is a range of zero to three hundred sixty degrees (0-360°). The motor position sensor 210 generates and transmits an output signal indicative of the sensed angular position of the motor rotor 164 to the controller 180.

At step 430, the controller 180 calculates an absolute angular position associated with a position of the steering rack 155 in a full-turn range of movement of the steering rack 155 based on the angular position of the pinion 120 detected by the pinion angle sensor 310 and the angular position of the motor 165 sensed by the motor position sensor 210. The full-turn range of the movement of the steering rack 155 may be or correspond to, for example, but not limited to, the full-turn range of rotation of the pinion 120, the full-turn range of rotation of the hand wheel 105 or the full-turn range of any steering movement related to a position of the steering rack 155. In an exemplary embodiment, the controller 180 calculates an absolute angular position of the pinion 120 in a full-turn range of rotation of the pinion 120 based on the angular position of the pinion 120 detected by the pinion angle sensor 310 and the angular position of the motor 165 sensed by the motor position sensor 210. For instance, the full-turn range of rotation of the pinion 120 is three (3) complete turns, a range of zero to one thousand eighty degrees (0°-1080°) or a range of minus five hundred forty to plus five hundred forty degrees (−540°-+540°). In order to express the full-turn range of the pinion 120, the controller 180 utilizes an algorithm or look-up-table. The algorithm or look-up-table may be embodied in a programmed digital computer or a custom digital processor included in the controller 180 (See FIG. 6).

For example, the absolute angular position associated with the position of the steering rack 155, such as the absolute angular position of the pinion 120, can be calculated using ratio between rotation rates at which the pinion 120 and the rotor 164 of the motor 165 rotate. The gear ratio between the pinion gear 125 and the pulley 166 of the motor 165 can be used. By providing different rotation rate or speed of the pinion gear 125 and the pulley 166 of the motor 165, a difference between the angular position of the pinion gear 125 detected by the pinion angle sensor 310 and the angular position of the motor shaft 168 or the motor pulley 166 sensed by the motor position sensor 210 is generated which will assume a unique value throughout the full range of rotation of the pinion 120. This difference provides a value which may be conveniently used to determine the absolute angular position associated with the position of the steering rack 155, such as the absolute angular position of the pinion 120, even though neither the pinion angle sensor 310 nor the motor position sensor 210 is suitable for independently indicating the absolute angular position associated with the position of the steering rack 155, such as the absolute angular position of the pinion 120, throughout the full range of motion.

The Vernier algorithm can be used to calculate the absolute angular position associated with the position of the steering rack 155, such as the absolute angular position of the pinion 120, based on the angular position of the pinion 120 and the angular position of the motor 165. The Vernier algorithm may figure out the absolute angular position associated with the position of the steering rack 155, such as an absolute angle of the pinion 120, by using phase difference of the angular position of the pinion 120 and the angular position of the motor 165 with different cycles.

Figure 5:
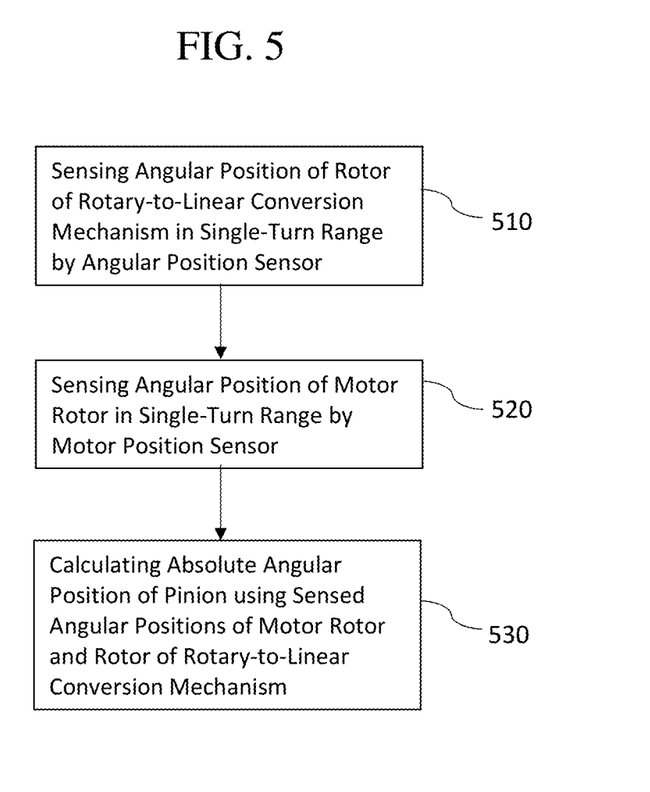
FIG. 5 is a flow diagram of a method for calculating an absolute angular position associated with a position of a steering rack according another exemplary embodiment of the present disclosure.

FIG. 5 is a flow diagram of a method for calculating an absolute angular position associated with a position of a steering rack according another exemplary embodiment of the present disclosure.

At step 510, the angular position sensor 225 of the rotary-to-linear conversion mechanism 170 may detect or sense an angular position of a rotor of the rotary-to-linear conversion mechanism 170, for example, but not limited to, the pulley 172, the main-gear 221 and the sub-gear 222, in a single-turn range which is a range of zero to three hundred sixty degrees (0-360°). The angular position sensor 225 of the rotary-to-linear conversion mechanism 170 generates and transmits an output signal indicative of the sensed angular position of the rotor 172, 221 or 222 of the rotary-to-linear conversion mechanism 170 to the controller 180.

At step 520, the motor position sensor 210 detects or senses an angular position of the motor rotor 164 (such as the motor pulley 166 or the motor rotation shaft 168) in a single-turn range which is a range of zero to three hundred sixty degrees (0-360°) The motor position sensor 210 generates and transmits an output signal indicative of the sensed angular position of the motor rotor 164 to the controller 180.

At step 530, the controller 180 calculates an absolute angular position associated with a position of the steering rack 155 in a full-turn range of movement of the steering rack 155 based on the angular position of the rotor 172, 221 or 222 of the rotary-to-linear conversion mechanism 170 detected by the angular position sensor 225 and the angular position of the motor 165 sensed by the motor position sensor 210. The full-turn range of the movement of the steering rack 155 may be or correspond to, for example, but not limited to, the full-turn range of rotation of the pinion 120, the full-turn range of rotation of the hand wheel 105 or the full-turn range of any steering movement related to a position of the steering rack 155. In an exemplary embodiment, the controller 180 calculates an absolute angular position of the pinion 120 in a full-turn range of rotation of the pinion 120 based on the angular position of the rotor 172, 221 or 222 of the rotary-to-linear conversion mechanism 170 detected by the angular position sensor 225 and the angular position of the motor 165 sensed by the motor position sensor 210. For instance, the full-turn range of rotation of the pinion 120 is three (3) complete turns, a range of zero to one thousand eighty degrees (0°-1080°) or a range of minus five hundred forty to plus five hundred forty degrees (−540°-+540°). In order to express the full-turn range of the pinion 120, the controller 180 utilizes an algorithm or look-up-table. The algorithm or look-up-table may be embodied in a programmed digital computer or a custom digital processor included in the controller 180 (See FIG. 6).

For example, the absolute angular position associated with the position of the steering rack 155, such as the absolute angular position of the pinion 120, can be calculated using ratio between rotation rates at which the sub-gear 222 of the rotary-to-linear conversion mechanism 170 and the rotor 164 of the motor 165 rotate. The gear ratio between the sub-gear 222 of the rotary-to-linear conversion mechanism 170 and the rotor 164 of the motor 165 can be used. By providing different rotation rate or speed of the sub-gear 222 of the rotary-to-linear conversion mechanism 170 and the pulley 166 of the motor 165, a difference between the angular position of the sub-gear 222 of the rotary-to-linear conversion mechanism 170 detected by the angular position sensor 225 and the angular position of the motor shaft 168 or the motor pulley 166 sensed by the motor position sensor 210 is generated which will assume a unique value throughout the full range of rotation of the pinion 120. This difference provides a value which may be conveniently used to determine the absolute angular position associated with the position of the steering rack 155, such as the absolute angular position of the pinion 120, even though neither the angular position sensor 225 nor the motor position sensor 210 is suitable for independently indicating the absolute angular position associated with the position of the steering rack 155, such as the absolute angular position of the pinion 120, throughout the full range of motion.

The Vernier algorithm can be used to calculate the absolute angular position associated with the position of the steering rack 155, such as the absolute angular position of the pinion 120, based on the angular position of the rotor 172, 221 or 222 of the rotary-to-linear conversion mechanism 170 and the angular position of the rotor 164 of the motor 165. The Vernier algorithm may figure out the absolute angular position associated with the position of the steering rack 155, such as the absolute angle of the pinion 120, by using phase difference of the angular position of the rotor 172, 221 or 222 of the rotary-to-linear conversion mechanism 170 and the angular position of the rotor 164 of the motor 165 with different cycles.

Without mounting an absolute angular sensor assembly having at least more than two sub-gears and corresponding sensors to the steering system, some embodiments of the present disclosure can calculate an absolute angular position associated with the position of a steering rack, such as the absolute angular position of a hand wheel or pinion, using the angular position sensor 225 of the rotary-to-linear conversion mechanism 170 and the motor position sensor 210 or using the pinion angle sensor 310 and the motor position sensor 210.

Figure 6:
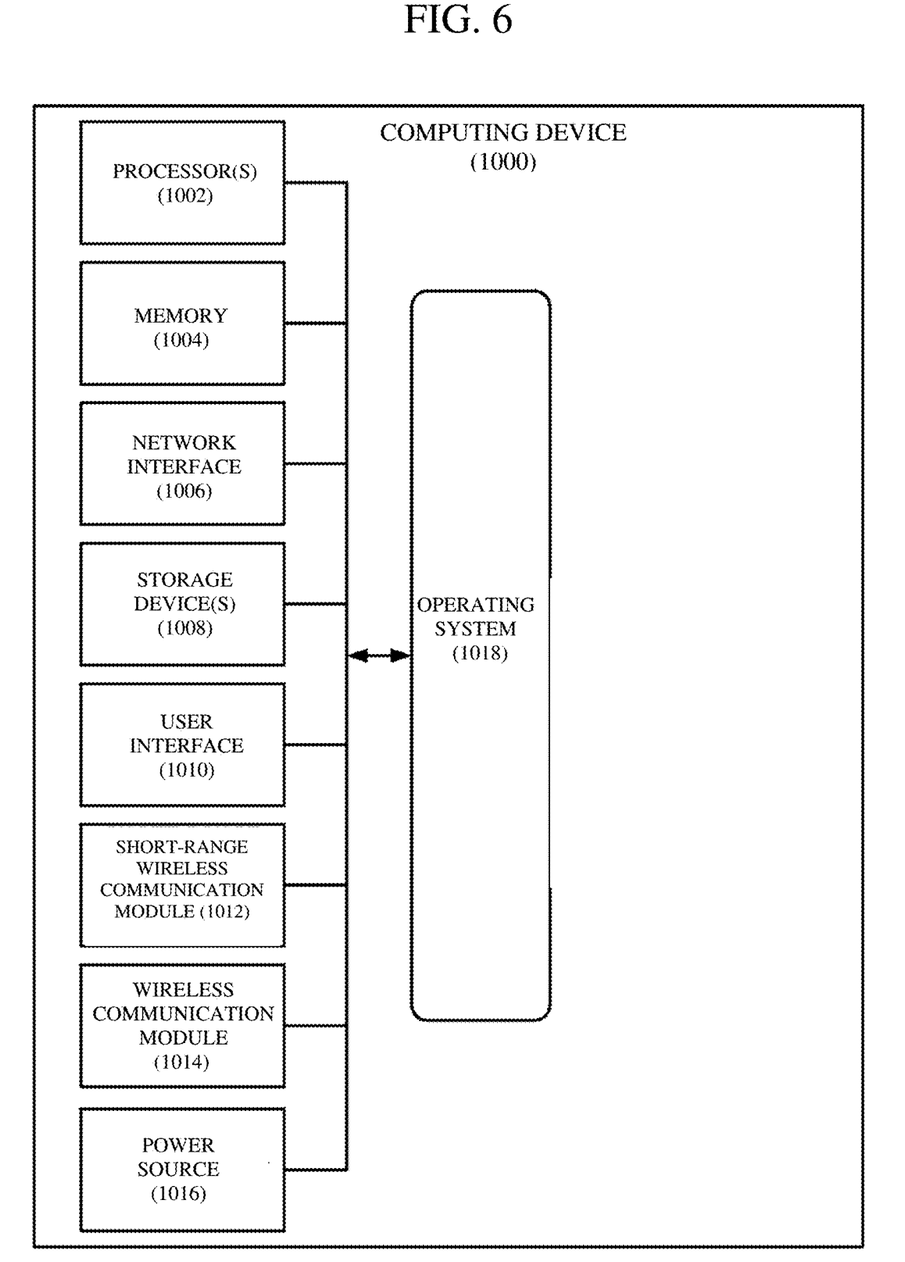
FIG. 6 shows a block diagram of a controller of a vehicle steering system according to an embodiment of the present disclosure.

FIG. 6 shows a block diagram illustrating components of an example computing device, such as the controller 180 shown in FIG. 1. FIG. 6 illustrates only one particular example of the controller 180, and many other examples of the controller 180 may be used in other instances.

As shown in the specific example of FIG. 6, an computing device 1000, such as the controller 180 shown in FIG. 1, may include one or more processors 1002, memory 1004, network interface 1006, one or more storage devices 1008, user interface 1010, short-range wireless communication module 1012, wireless communication module 1014, and power source 1016. Computing device 1000 may also include operating system 1018, which may include modules and/or applications that are executable by one or more processors 1002 and computing device 1000. Each of the components 1002, 1004, 1006, 1008, 1010, 1012, 1014, 1016, and 1018 may be interconnected (physically, communicatively, and/or operatively) for inter-component communications.

One or more processors 1002, in one example, may be configured to implement functionality and/or process instructions for execution within computing device 1000. For example, one or more processors 1002 may be capable of processing instructions stored in memory 304 or instructions stored on one or more storage devices 1008. These instructions may define or otherwise control the operation of operating system 1018.

Memory 1004 may, in one example, be configured to store information within computing device 1000 during operation. Memory 1004, in some examples, may be described as a computer-readable storage medium. In some examples, memory 1004 may be a temporary memory, meaning that a primary purpose of memory 1004 is not long-term storage. Memory 1004 may, in some examples, be described as a volatile memory, meaning that memory 1004 does not maintain stored contents when computing device 1000 is turned off. Examples of volatile memories may include random access memories (RAM), dynamic random access memories (DRAM), static random access memories (SRAM), and other forms of volatile memories known in the art. In some examples, memory 1004 may be used to store program instructions for execution by one or more processors 1002. Memory 1004 may, in one example, be used by software or applications running on computing device 1000 to temporarily store information during program execution.

One or more storage devices 1008 may, in some examples, also include one or more computer-readable storage media. One or more storage devices 1008 may be configured to store larger amounts of information than memory 1004. One or more storage devices 1008 may further be configured for long-term storage of information. In some examples, one or more storage devices 1008 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 1000 may, in some examples, also include network interface 306. Computing device 1000 may, in one example, use network interface 306 to communicate with external devices via one or more networks. Network interface 506 may be a network interface card, such as an Ethernet card, an optical transceiver, a radio frequency transceiver, or any other type of device that can send and receive information. Other examples of such network interfaces may include Bluetooth, 5G and Wi-Fi radios in mobile computing devices as well as universal serial bus (USB). In some examples, computing device 1000 may the network interface 1006 to wirelessly communicate with an external device such as a server, mobile phone, or other networked computing device.

Computing device 1000 may, in one example, also include user interface 1010. User interface 1010 may be configured to receive input from a user (e.g., tactile, audio, or video feedback). User interface 1010 may include a touch-sensitive and/or a presence-sensitive screen or display, mouse, a keyboard, a voice responsive system, or any other type of device for detecting a command from a user. In some examples, user interface 1010 may include a touch-sensitive screen, mouse, keyboard, microphone, or camera.

User interface 1010 may also include, combined or separate from input devices, output devices. In this manner, user interface 1010 may be configured to provide output to a user using tactile, audio, or video stimuli. In one example, user interface 1010 may include a touch-sensitive screen or display, sound card, a video graphics adapter card, or any other type of device for converting a signal into an appropriate form understandable to humans or machines. In addition, user interface 1010 may include a speaker, a cathode ray tube (CRT) monitor, a liquid crystal display (LCD), or any other type of device that can generate intelligible output to a user.

Computing device 1000, in some examples, may include power source 1016, which may be a rechargeable battery and may provide power to computing device 1000. Power source 1016 may, in some examples, be a battery made from nickel-cadmium, lithium-ion, or other suitable material. In other examples, power source 1016 may be a power source capable of providing stored power or voltage from another power source.

In addition, computing device 1000 may include short-range wireless communication module 1012. Short-range wireless communication module 1012 may be active hardware that is configured to communicate with other short-range wireless communication modules. Examples of short-range wireless communication module 1012 may include an NFC module, an RFID module, and the like. In general, short-range wireless communication module 1012 may be configured to communicate wirelessly with other devices in physical proximity to short-range wireless communication module 1012 (e.g., less than approximately ten centimeters, or less than approximately four centimeters). In other examples, short-range wireless communication module 1012 may be replaced with an alternative short-range communication device configured to communicate with and receive data from other short-range communication devices. These alternative short-range communication devices may operate according to Bluetooth, Ultra-Wideband radio, or other similar protocols. In some examples, short-range wireless communication module 1012 may be an external hardware module that is coupled with computing device 1000 via a bus (such as via a Universal Serial Bus (USB) port). short-range wireless communication module 1012, in some examples, may also include software which may, in some examples, be independent from operating system 1018, and which may, in some other examples, be a sub-routine of operating system 1018.

The computing device 1000, in some examples, may also include wireless communication module 1014. Wireless communication module 1014 may, in some examples, may be a device operable to exchange data with other wireless communication modules over short distances (e.g., less than or equal to ten meters). Examples of wireless communication module 1014 may include a Bluetooth module, a WiFi direct module, and the like.

Computing device 1000 may also include operating system 1018. Operating system 1018 may, in some examples, control the operation of components of computing device 1000. For example, operating system 1018 may, in one example, facilitate the interaction with one or more processors 1002, memory 1004, network interface 1006, one or more storage devices 1008, user interface 1010, short-range wireless communication module 1012, wireless communication module 1014, and power source 1016.

Any applications implemented within or executed by computing device 1000 may be implemented or contained within, operable by, executed by, and/or be operatively/communicatively coupled to components of computing device 1000 (e.g., one or more processors 1002, memory 1004, network interface 1006, one or more storage devices 1008, user interface 1010, short-range wireless communication module 1012, wireless communication module 1014, and/or power source 1016).

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A vehicle steering system, comprising:
a motor assembly comprising a motor having a first rotor and a motor position sensor configured to sense a first rotor angle of the motor in a single-turn range;
a rotary-to-linear conversion mechanism operably coupled between the motor assembly and a steering rack to convert a rotational force of the motor into a linear force for moving the steering rack, the rotary-to-linear conversion mechanism comprising a second rotor operably coupled to the first rotor of the motor and an angular position sensor configured to sense a second rotor angle of the second rotor of the rotary-to-linear conversion mechanism in a single-turn range, wherein the steering rack is operably coupled to a pinion; and
a processor configured to calculate an absolute angular position associated with a position of the steering rack in a full-turn range associated with movement of the steering rack based on the sensed first rotor angle of the motor and the sensed second rotor angle of the second rotor of the rotary-to-linear conversion mechanism using ratio between rates at which the first rotor of the motor and the second rotor of the rotary-to-linear conversion mechanism rotate.

2. The vehicle steering system of claim 1, wherein the absolute angular position associated with the position of the steering rack in the full-turn range associated with the movement of the steering rack is an absolute angular position of the pinion in the full-turn range of rotation of the pinion.

3. The vehicle steering system of claim 1, wherein the processor is configured to calculate the absolute angular position associated with the position of the steering rack based on the sensed first rotor angle of the motor and the sensed second angle of the second rotor of the rotary-to-linear conversion mechanism using a Vernier algorithm.

4. The vehicle steering system of claim 1, wherein:
the rotary-to-linear conversion mechanism comprises a first gear configured to be rotated by the first rotor of the motor and the second rotor of the rotary-to-linear conversion mechanism is a second gear rotatably connected to the first gear,
the angular position sensor is configured to sense the angle of the second gear of the rotary-to-linear conversion mechanism in a single-turn range, and
the processor is configured to calculate the absolute angular position associated with the position of the steering rack in the full-turn range associated with the movement of the steering rack based on the sensed rotor angle of the motor and the sensed angle of the second gear of the rotary-to-linear conversion mechanism.

5. The vehicle steering system of claim 1, wherein the single-turn range is a three hundred sixty (360) degree range, and the full-turn range corresponds to a movable range of the steering rack.

6. The vehicle steering system of claim 1, wherein the rotary-to-linear conversion mechanism comprises a ball-nut assembly.

7. A vehicle steeling system, comprising:
a pinion angle sensor configured to sense a pinion angle in a single-turn range, wherein the pinion angle is associated with a pinion operably coupled to a steering rack;
a motor assembly operably coupled to the steering rack, the motor assembly comprising a motor having a rotor and a motor position sensor configured to sense a rotor angle of the motor in a single-turn range; and
a processor configured to calculate an absolute angular position associated with a position of the steering rack in a full-turn range associated with movement of the steering rack based on the sensed pinion angle and the sensed rotor angle of the motor using ratio between rates at which the pinion and the rotor of the motor rotate.

8. The vehicle steering system of claim 7, wherein the absolute angular position associated with the position of the steering rack in the full-turn range associated with the movement of the steering rack is an absolute angular position of the pinion in the full-turn range of rotation of the pinion.

9. The vehicle steering system of claim 7, wherein the processor is configured to calculate the absolute angular position associated with the position of the steering rack based on the sensed pinion angle and the sensed rotor angle of the motor using a Vernier algorithm.

10. The vehicle steering system of claim 7, further comprising a rotary-to-linear conversion mechanism operably coupled between the motor assembly and the steering rack.

11. The vehicle steering system of claim 10, wherein the rotary-to-linear conversion mechanism comprises a ball-nut assembly.

12. The vehicle steering system of claim 7, wherein the single-turn range is a three hundred sixty (360) degree range, and the full-turn range corresponds to a movable range of a steering rack.

* * * * *